(12) United States Patent
Okamura et al.

(10) Patent No.: US 6,196,054 B1
(45) Date of Patent: Mar. 6, 2001

(54) COMBUSTION STATE DETECTING DEVICE FOR AN INTERNAL COMBUSTION ENGINE

(75) Inventors: Koichi Okamura; Mituru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/306,512

(22) Filed: May 7, 1999

(30) Foreign Application Priority Data

Jan. 27, 1999 (JP) .................................................. 11-018610

(51) Int. Cl.⁷ .............................. G01M 15/00; F02P 5/14
(52) U.S. Cl. ........................................... 73/35.08; 123/425
(58) Field of Search ............................... 73/35.01, 35.07, 73/35.08, 116, 115; 123/425, 494, 416, 435, 634, 635; 324/378, 380, 388, 391, 393, 399

(56) References Cited

U.S. PATENT DOCUMENTS

| | | | |
|---|---|---|---|
| 5,694,900 | * 12/1997 | Morita et al. | 73/35.08 |
| 5,785,020 | * 7/1998 | Takahashi et al. | 73/35.08 |
| 5,959,192 | * 9/1999 | Mogi et al. | 73/35.07 |
| 5,979,406 | * 11/1999 | Aoki et al. | 73/35.08 |
| 6,011,397 | * 1/2000 | Yasuda | 73/35.08 |
| 6,054,859 | * 4/2000 | Takahashi et al. | 73/35.08 |

FOREIGN PATENT DOCUMENTS 10-252633    9/1998 (JP).

* cited by examiner

Primary Examiner—Helen C. Kwok
(74) Attorney, Agent, or Firm—Sughrue, Mion, Zinn, Macpeak & Seas, PLLC

(57) ABSTRACT

To obtain a combustion state detecting device in which a detection range is optimized to thereby make it possible to improve the S/N ratio, thereby making it possible to enhance the accuracy in detection of the combustion state of the internal combustion engine, in particular, the accuracy in knock detection. The combustion state detecting device for an internal combustion engine includes an ignition plug 4 which discharges by application of the ignition high voltage to fire a fuel-air mixture within a cylinder of an internal combustion engine, a bias circuit 5 for applying a bias voltage to the ignition plug, a current detector circuit 21 for detecting an ion current corresponding to the quantity of ions which are generated within the cylinder in which the fuel-air mixture is being burned as an ion current detection signal, knock signal processing means 24 to 27 for producing a knock decision signal representative of a knock occurrence state of the internal combustion engine on the basis of the ion current detection signal, and an ECU 15 for detecting the combustion state in the ignition plug on the basis of the ion current detection signal and the knock decision signal. The knock signal processing means sets a detection period of the knock decision signal on the basis of an integral value of the ion current detection signal.

15 Claims, 9 Drawing Sheets

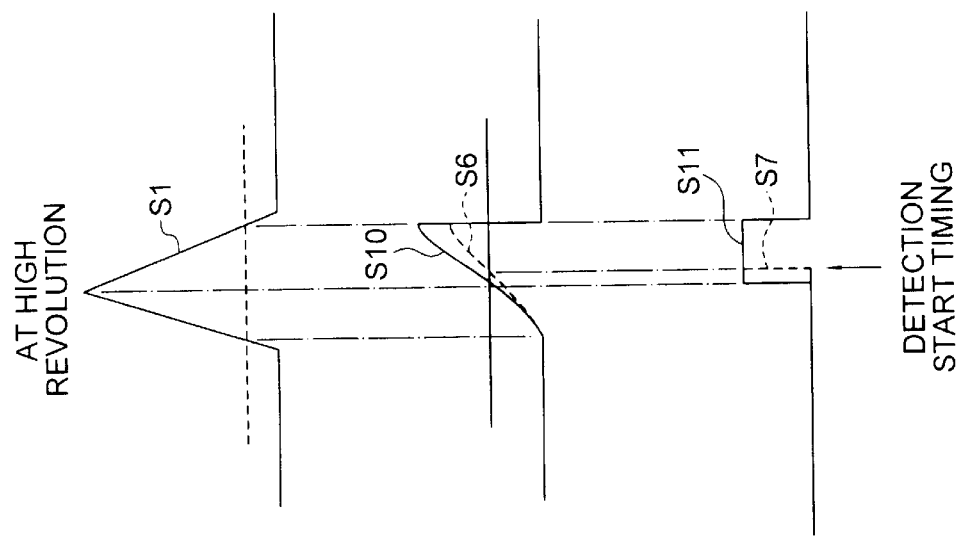
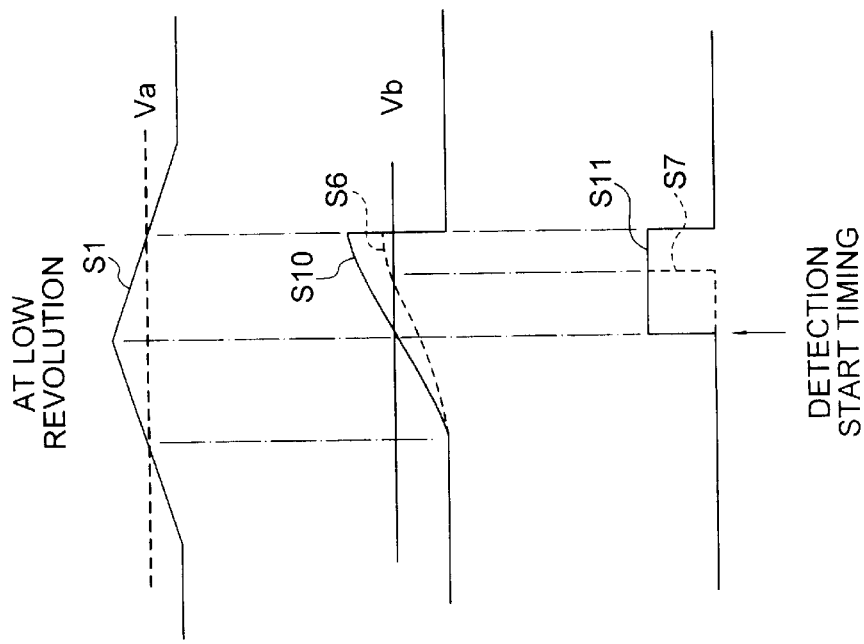
FIG. 4A  FIG. 4B  FIG. 4C

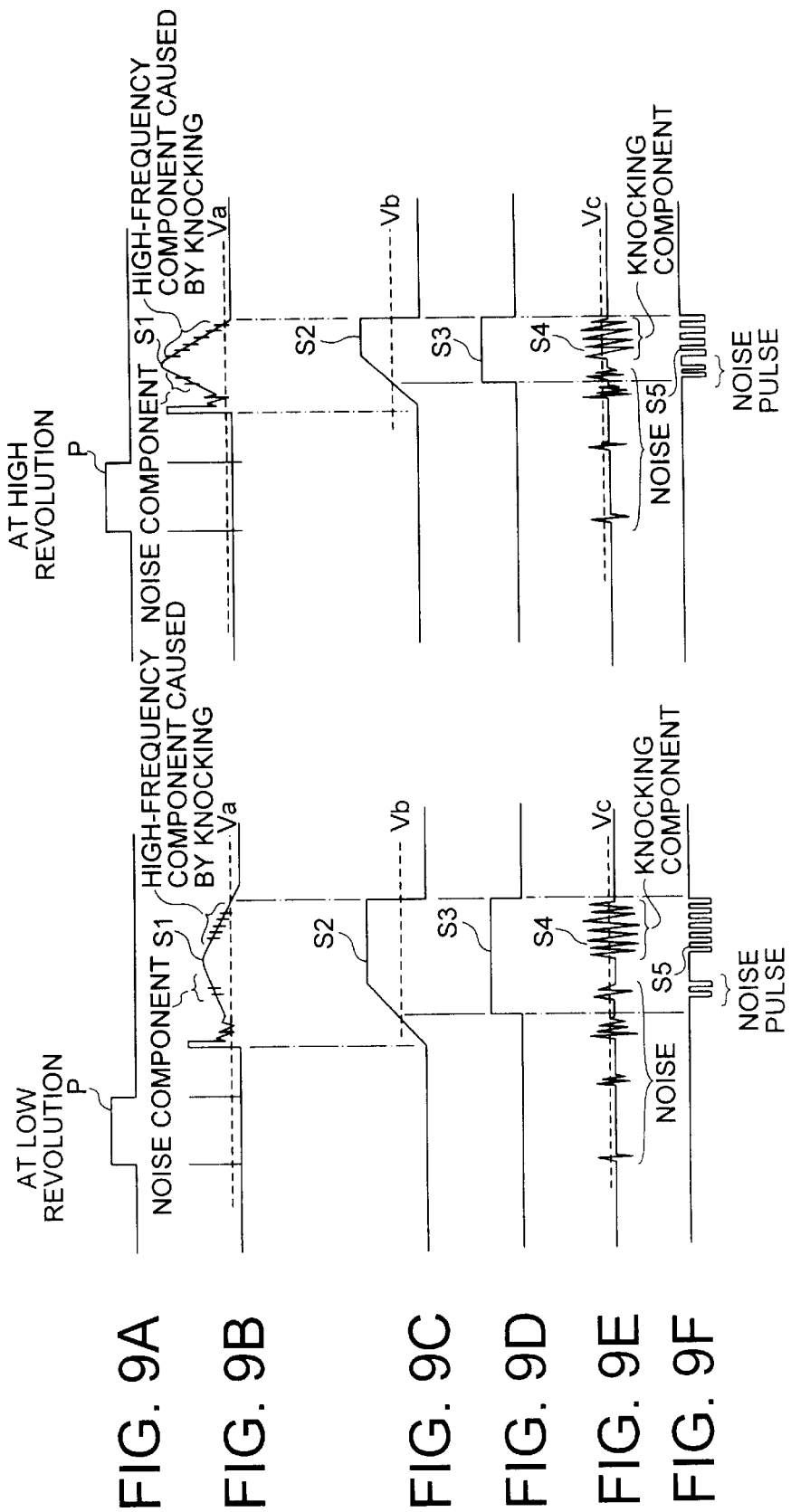

COMBUSTION STATE DETECTING DEVICE FOR AN INTERNAL COMBUSTION ENGINE

BACKGROUND OF THE INVENTION

1. Field of the Invention

The present invention relates to a combustion state detecting device that detects a combustion state of an internal combustion engine by detection of a change in the quantity of ions which are produced at the time of burning in the internal combustion engine, and more particularly to a combustion state detecting device for an internal combustion engine which is capable of accurately conducting knocking detection or misfire detection.

2. Description of the Related Art

In general, in an internal combustion engine driven by a plurality of cylinders, the fuel-air mixture consisting of air and fuel introduced into the combustion chambers of the respective cylinders is compressed by moving up pistons, electric sparks are generated by applying an ignition high voltage to ignition plugs located in the respective combustion chambers, and an explosion force developed at the time of burning the fuel-air mixture is converted into a piston push-down force, to thereby extract the piston push-down force as an rotating output of the internal combustion engine.

There has been known that since molecules within the combustion chambers are ionized when the fuel-air mixture has been burned within the combustion chambers, ions having electric charges flow between the ignition plugs as an ion current upon application of a bias voltage to ion current detection electrodes (as usual, ignition plug electrodes are used) located within the combustion chambers.

Also, there has been known that the combustion state of the internal combustion engine can be detected by detection of a state in which the ion current occurs because the ion current is sensitively varied according to the combustion state within the combustion chambers.

FIG. 8 is a circuit block diagram showing one example of a conventional combustion state detecting device for an internal combustion engine.

In the figure, an anode of a battery 1 mounted on a vehicle is connected to one end of a primary winding 2a of an ignition coil 2 whereas the other end of the primary winding 2a is connected to the ground through a power transistor 3 having an emitter thereof grounded for interrupting the supply of a primary current.

A secondary winding 2b of the ignition coil 2 constitutes a transformer in corporation with the primary winding 2a, and a high-voltage side of the secondary winding 2b is connected to one end of an ignition plug 4 corresponding to each cylinder (not shown) to output a high voltage of negative polarity at the time of controlling ignition.

The ignition plug 4 made up of counter electrodes is applied with an ignition high voltage to discharge and fire the fuel-air mixture within each of the cylinders.

The ignition coil 2 and the ignition plug 4 are disposed in parallel for each of the cylinders, however, in this example, only one pair of ignition coil 2 and ignition plug 4 are representatively shown.

A bias circuit 5 includes a capacitor 5a connected to a low-voltage side of the secondary winding 2b, a bias voltage limit Zener diode 5b connected in parallel with the capacitor 5a, and a diode 5c disposed between the capacitor 5a and the ground. A current-voltage convertor circuit 6 includes a resistor 6a connected in parallel with the diode 5c.

A series circuit consisting of the capacitor 5a and the diode 5c and the Zener diode 5b connected in parallel with the capacitor 5a are disposed between the low-voltage side of the secondary winding 2b and the ground, to thus constitute a charging path for charging the capacitor 5a with the bias voltage at the time of generating the ignition current.

During the off state of the power transistor 3 (at the time of interrupting the supply of a current to the primary winding 2a), the capacitor 5a is charged with the secondary current that flows through the ignition plug 4 discharged by a high voltage outputted from the secondary winding 2b. The charge voltage is limited to a given bias voltage (for example, about several hundreds V) by the Zener diode 5c and functions as the ion current detection bias means, that is, a power supply.

The resistor 6a within the current-voltage convertor circuit 6 converts an ion current allowed to flow by the bias voltage into a voltage to output the voltage thus converted to a knock signal generator circuit 7 and a delay circuit 8 as an ion current detection signal. The knock signal generator circuit 7 is made up of a filter circuit 7a and a comparator circuit 7b. The filter circuit 7a extracts a high-frequency vibration component contained in an ion current detection waveform at the time of generating knocking. The comparator circuit 7b compares the output of the filter circuit 7a with a given reference value Vc and converts a comparison result into a rectangular wave.

The delay circuit 8 includes an operational amplifier 8a, a resistor 8b connected between a positive power supply terminal $V_B$ and the ground, and a capacitor 8c. The non-inverse input terminal of the operational amplifier 8a is connected to the output side of the current-voltage convertor circuit 6, the inverse input terminal thereof is connected to a negative power supply terminal having a given reference value Va, and the output terminal thereof is connected to a node of the resistor 8b and the capacitor 8c.

A comparator circuit 9 includes an operational amplifier 9a and a resistor 9b. The non-inverse input terminal of the operational amplifier 9a is connected to the output side of the delay circuit 8, the inverse input terminal thereof is connected to a negative power supply terminal having a given reference value Vb, and the output terminal thereof is connected to the positive power supply $V_B$ through the resistor 9b and also connected to the base of the transistor 10. The emitter of the transistor 10 is grounded, and the collector thereof is connected to the positive power supply terminal $V_B$ through a resistor 11 and also connected to the base of a transistor 12.

The emitter of the transistor 12 is grounded, and the collector thereof is connected to the output side of the comparator circuit 7b, connected to the base of a transistor 14 and also connected to the positive power supply terminal $V_B$ through a resistor 13. The emitter of the transistor 14 is grounded, and the collector thereof is connected to an ECU (electronic control unit) 15. Structural elements 5 to 14 constitute a fuel state detector circuit 20.

The ECU 15 made up of a microcomputer judges a combustion state of the internal combustion engine on the basis of the ion current detection signal, and if the ECU 15 detects the deterioration of the combustion state, it appropriately conducts adaptive control so as not to cause any inconvenience.

Also, the ECU 15 arithmetically operates an ignition timing, etc., on the basis of drive conditions obtained from a variety of sensors (not shown), and outputs not only an ignition signal to the power transistor 3 but also a fuel injection signal to an injector (not shown) for each cylinder, and drive signals to a variety of actuators (a throttle valve, an ISC valve, etc.).

Subsequently, the operation of the conventional combustion state detecting device for an internal combustion engine shown in FIG. 8 will be described with reference to FIGS. 9A to 9F. The left side of FIGS. 9A to 9F shows signal waveforms appearing in the respective circuit portions when the internal combustion engine is in a low-revolution state, whereas the right side of FIGS. 9A to 9F shows waveforms when it is in a high-revolution state.

In general, the ECU 15 arithmetically operates the ignition timing, etc., in accordance with the drive conditions, and supplies an ignition signal P shown in FIG. 9A to the base of the power transistor 3 at a desired control timing to control the on/off operation of the power transistor 3.

As a result, the power transistor 3 interrupts the supply of the primary current flowing in the primary winding 2a of the ignition coil 2 to boost the primary voltage, and also develops an ignition high voltage (for example, several tens kV) at the high-voltage side of the secondary winding 2b.

The secondary voltage is applied to the ignition plug 4 for each of the cylinders and allowed to generate a discharge spark within the combustion chamber of an ignition control cylinder to burned he fuel-air mixture. In this situation, if the combustion state is normal, a required quantity of ions are generated in the periphery of the ignition plug 4 and within the combustion chamber.

Then, as described above, when the power transistor 3 is turned on in response to the ignition signal P, the supply of the current to the primary winding 2a starts, to thereby develop the voltage of the positive polarity at the high-voltage side of the secondary winding 2b.

Sequentially, at the time of interrupting the primary current, if the ignition high voltage is developed at the high-voltage side of the secondary winding 2b to make the ignition plug 4 discharge, the secondary current charges the capacitor 5a up to a predetermined voltage.

Also, since ions are generated by the discharge of the ignition plug 4, the ion current i flows in a direction indicated by a broken-line arrow in FIG. 8, as a result of which an ion current detection signal S1 on which a noise component or a high-frequency component caused by knocking is superimposed is obtained as shown in FIG. 9B.

The ion current detection signal S1 is supplied to the delay circuit 8 where it is compared with a predetermined reference value Va so as to be outputted at the output side thereof as a signal S2 shown in FIG. 9c. The signal S2 is compared with a given reference value Vb by the succeeding comparator circuit 9 so that a pulse signal S3 shown in FIG. 9D which is delayed a predetermined amount from the rising of the ion current detection signal S1 is outputted at the output side of the comparator circuit 9.

The pulse signal S3 is supplied to the transistor 10 as a switching signal so that the transistor 10 turns on and the transistor 12 turns off when the pulse signal S3 is high in level whereas the transistor 10 turns off and the transistor 12 turns on when the pulse signal S3 is low in level.

On the other hand, the ion current detection signal S1 from the current-voltage convertor circuit 6 is supplied to the filter circuit 7a in the knock signal generator circuit 7, where a frequency band substantially corresponding to the knock of the internal combustion engine is extracted from the ion current detection signal S1, and a signal S4 shown in FIG. 9E is outputted at the output side of the filter circuit 7a.

The signal S4 is supplied to the comparator circuit 7b at a succeeding stage where the signal S4 is compared with a given reference value Vc, and its comparison result is outputted, as a pulse signal S5 substantially corresponding to the occurrence of knock as shown in FIG. 9F, to the output terminal OUT of the combustion state detecting device 20 through the final transistor 14 the on/off operation of which is controlled in response to the pulse signal S3 that is a switching signal from the comparator circuit 9.

In other words, since the transistor 10 turns on, and the transistor 12 is off when the pulse signal S3 from the comparator circuit 9 is high in level, the transistor 14 to which the output of the comparator circuit 7b is supplied as it is turns on when the output of the comparator circuit 7b is high in level (when the level of the signal S4 is larger than the reference value Vc) but turns off when it is low in level (when the level of the signal S4 is smaller than the reference value Vc), with the result that the pulse signal S5 shown in FIG. 9F is obtained at the output terminal OUT of the combustion state detecting device 20 as a signal corresponding to the occurrence of knock.

The conventional combustion state detecting device for the internal combustion engine thus structured suffers from problems stated below.

That is, the high-frequency vibration component of knocking occurs from the peak of the ion current detection signal waveform, and there is the possibility that noise components analogous to the high-frequency component caused by knocking are contained in an entire range of waveforms due to the distortion of the waveform caused by the fluctuation of the combustion state, the superimposing of extraneous noises, noises caused by ignition operation, or the like. For that reason, the conventional device removes the ignition noise components mainly immediately after discharging operation has been completed, by the provision of the delay circuit 8, the comparator circuit 9 and the transistors 10, 12 to make a given period after the ion current detection signal has occurred in a non-detection period.

On the other hand, the ion current detection signal varies in waveform according to the drive conditions of an engine, and also differs in time width depending on the conditions. As a result, a detection period gets prolonged more than a required detection period particularly in a low-revolution condition where the time width is wide, thereby leading to such problems that the S/N ratio is deteriorated by taking more noise components, and the accuracy in detection of the combustion state of the internal combustion engine, in particular, the accuracy in knock detection is deteriorated.

SUMMARY OF THE INVENTION

The present invention has been made to solve the above problems inherent in the conventional devices, and therefore an object of the present invention is to provide a combustion state detecting device for an internal combustion engine in which a detection range is optimized to improve the S/N ratio, thereby making it possible to enhance the accuracy in detection of the combustion state of the internal combustion engine, in particular, the accuracy in knock detection.

According to a first aspect of the present invention, there is provided a combustion state detecting device for an internal combustion engine, comprising: an ignition coil that develops an ignition high voltage; an ignition plug that discharges by application of the ignition high voltage to fire a fuel-air mixture within a cylinder of an internal combustion engine; ion current detecting means including bias means for applying a bias voltage to the ignition plug, for detecting an ion current corresponding to the quantity of ions which are generated within the cylinder in which the fuel-air mixture is being burned as an ion current detection signal; knock signal processing means for producing a knock decision signal representative of a knock occurrence state of the internal combustion engine on the basis of the ion current detection signal; and an ECU which arithmetically operates the control parameter of the internal combustion engine and detects the combustion state in the ignition plug on the basis of the ion current detection signal and the knock decision signal, wherein the knock signal processing means sets a detection period of the knock decision signal on the basis of an integral value of the ion current detection signal.

According to a second aspect of the present invention, there is provided a combustion state detecting device for an internal combustion engine as set forth in the first aspect of the present invention, wherein the knock signal processing means comprises: filter means for extracting a frequency band corresponding to the knock of the internal combustion engine from the ion current detection signal; detection enable/disenable deciding means for outputting a detection enable/disenable signal representing whether or not the knock signal can be detected on the basis of the ion current detection signal; and knock signal switching means for making the output of the knock decision signal valid only when the detection enable/disenable signal represents a detection enable state.

According to a third aspect of the present invention, there is provided a combustion state detecting device for an internal combustion engine as set forth in the second aspect of the present invention, wherein the detection enable/disenable deciding means comprises: a first comparator circuit which compares the ion current detection signal with a first predetermined reference value; an integrator circuit which integrates the ion current detection signal during a period where the ion current detection signal exceeds the first reference value on the basis of the comparison result of the first comparator circuit; and a second comparator circuit which compares the output value of the integrator circuit with a second predetermined reference value to output the detection enable/disenable signal during a period where the output value of the integrator circuit exceeds the second reference value.

According to a fourth aspect of the present invention, there is provided a combustion state detecting device for an internal combustion engine as set forth in any of the first to third aspects of the present invention, wherein the ion current detecting means comprises a current mirror circuit disposed downstream of the bias means; and a plurality of current-voltage circuits, wherein the current mirror circuit supplies a current analogous to the ion current detection signal to the plurality of current-voltage circuits and the integrator circuit.

According to a fifth aspect of the present invention, there is provided a combustion state detecting device for an internal combustion engine as set forth in the third or fourth aspect of the present invention, wherein the integrator circuit adds a predetermined current value to the ion current detection signal to integrate the predetermined current value added to the ion current detection signal.

According to a sixth aspect of the present invention, there is provided a combustion state detecting device for an internal combustion engine as set forth in any one of the second to fifth aspects of the present invention, wherein the detection enable/disenable deciding means further comprises delay means for delaying a change in the output state of the first comparator circuit for a predetermined period when the comparison result of the first comparator circuit exceeds the first reference value.

According to a seventh aspect of the present invention, there is provided a combustion state detecting device for an internal combustion engine as set forth in the fifth or sixth aspect of the present invention, wherein the predetermined current value added to the integrator circuit is set so that a detection start timing of the detection enable/disenable signal is positioned in the vicinity of the peak position of the ion current detection signal in all drive conditions under which knock control is conducted.

According to an eighth aspect of the present invention, there is provided a combustion state detecting device for an internal combustion engine as set forth in the sixth aspect of the present invention, wherein the delay means also serves as delay means for producing a misfire decision signal which decides whether the internal combustion engine is burned or not.

BRIEF DESCRIPTION OF THE DRAWINGS

These and other objects, features and advantages of this invention will become more fully apparent from the following detailed description taken with the accompanying drawings in which:

FIGS. 4A to 4C are diagrams for explanation of the operation of the combustion state detecting device for an internal combustion engine in accordance with the second embodiment of the present invention;

FIGS. 9A to 9F are diagrams for explanation of the operation of the conventional combustion state detecting device for an internal combustion engine.

DETAILED DESCRIPTION OF THE PREFERRED EMBODIMENTS

Now, a description will be given in more detail of preferred embodiments of the present invention with reference to the accompanying drawings.

First Embodiment

Figure 1:
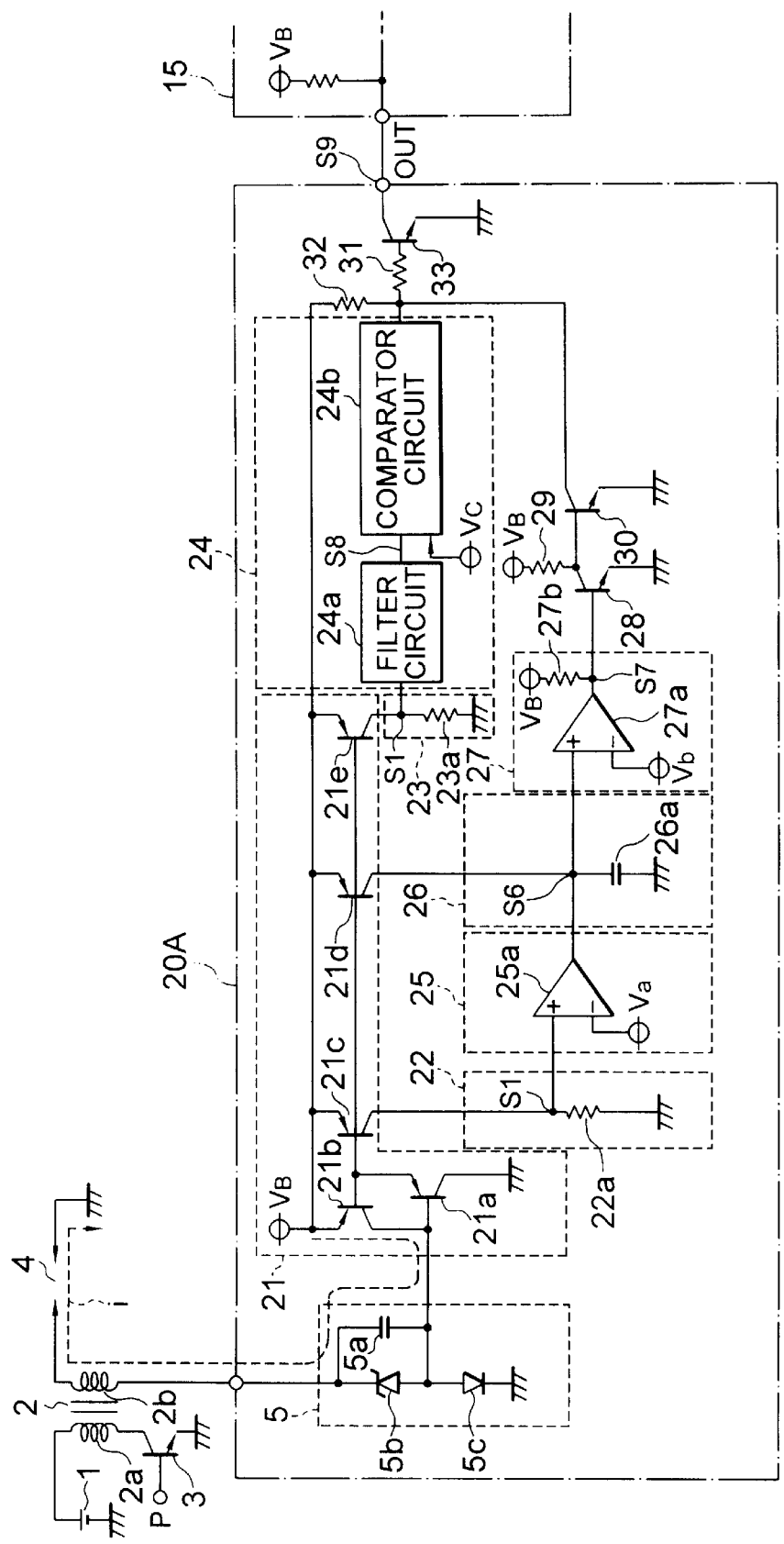
FIG. 1 is a circuit brock diagram showing a combustion state detecting device for an internal combustion engine in accordance with a first embodiment of the present invention.
Figure 8:
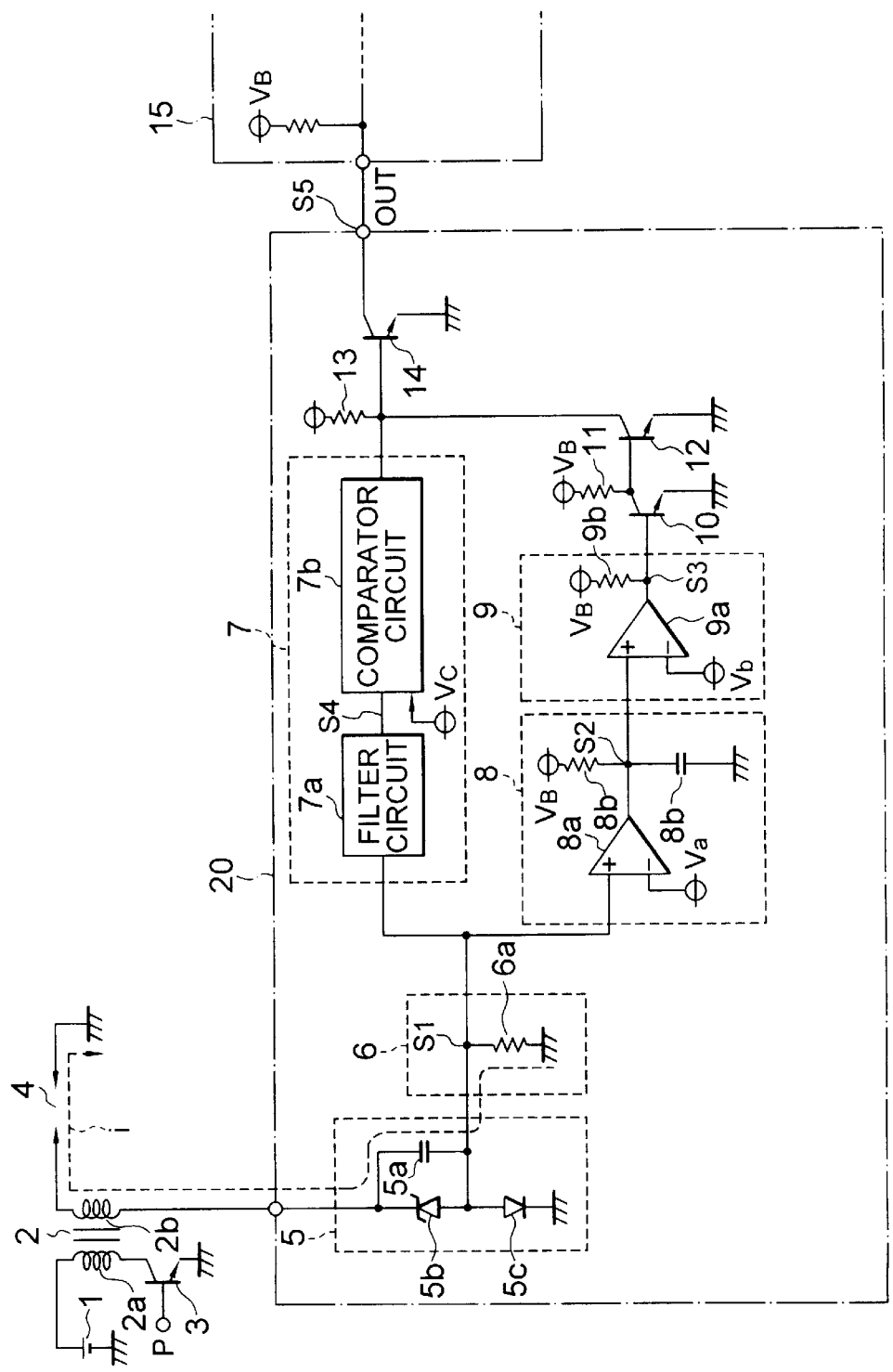
FIG. 8 is a circuit block diagram showing a conventional combustion state detecting device for an internal combustion engine.

FIG. 1 is a block diagram showing a combustion state detecting device for an internal combustion engine in accordance with a first embodiment of the present invention, in which parts corresponding to those in FIG. 8 are indicated by the same references, and their duplicate description will be omitted.

A current detector circuit 21 for detecting an ion current is made up of a current mirror circuit consisting of a plurality of transistors 21a to 21e. The base of the transistor 21a is connected to the output side of a bias circuit 5, the collector thereof is grounded and the emitter thereof is connected commonly to the base of the transistor 21b and the base of the transistor 21c.

The collector of the transistor 21b is connected to the base of the transistor 21a, and the emitter thereof is connected to a positive power supply terminal $V_B$. The collector of the transistor 21c is grounded through a resistor 22a of a first current-voltage convertor circuit 22, and the emitter thereof is connected to the positive power supply terminal $V_B$. Also, the bases of the transistors 21d and 21e are connected commonly to the bases of the transistors 21b and 21c, and the emitters of the transistors 21d and 21e are connected to the positive power supply terminal $V_B$ together.

The collector of the transistor 21e is grounded through a resistor 23a of a second current-voltage convertor circuit 23.

The resistor 23a in the second current-voltage convertor circuit 23 converts an ion current allowed to flow by a bias voltage and detected by the current detector circuit 21 into a voltage to output the voltage thus converted to a knock signal generator circuit 24 as an ion current detection signal. The knock signal generator circuit 24 is made up of a filter circuit 24a and a comparator circuit 24b. The filter circuit 24a extracts a high-frequency vibration component contained in an ion current detection waveform at the time of generating knocking. Also, the comparator circuit 24b compares the output of the filter circuit 24a with a predetermined reference value Vc to convert the comparison result into a rectangular wave.

Likewise, the resistor 22a in the first current-voltage convertor circuit 22 converts an ion current allowed to flow by the bias voltage and detected by the current detector circuit 21 into a voltage to output the voltage thus converted to a first comparator circuit 25 as an ion current detection signal.

The first comparator circuit 25 includes an operational amplifier 25a. The non-inverse input terminal of the operational amplifier 25a is connected to the output side of the current-voltage convertor circuit 22, the inverse input terminal thereof is connected to a reference terminal of a predetermined reference value Va, and the output terminal thereof is connected commonly to a node of a capacitor 26a that constitutes an integrator circuit 26 and the collector of the transistor 21d.

A second comparator circuit 27 includes an operational amplifier 27a and a resistor 27b. The non-inverse input terminal of the operational amplifier 27a is connected to the output side of the integrator circuit 26, the inverse input terminal thereof is connected to a reference terminal of the predetermined reference value Vb, and the output terminal thereof is connected to the positive power supply terminal $V_B$ through the resistor 27b and also connected to the base of a transistor 28.

The integrator circuit 26 charges the capacitor 26a with a current analogous to the ion current detection signal detected by the current detector circuit 21 comprised of the current mirror circuit during a period the voltage signal from the current-voltage convertor circuit 22 which has been compared with the reference value Vb by the comparator circuit 25 is equal to or larger than the reference value. Also, the comparator circuit 27 compares the charge voltage of the capacitor 26a with the reference value Vb to make valid a knock decision signal obtained at an output terminal OUT of a combustion state detecting device 20A during a period where the charge voltage value is equal to or larger than the reference value.

The emitter of the transistor 28 is grounded, and the collector thereof is connected to the positive power supply terminal $V_B$ through a resistor 29 and also connected to the base of a transistor 30. The emitter of the transistor 30 is grounded, and the collector thereof is connected to the output side of comparator circuit 24, connected to the base of a transistor 33 through a resistor 31, and also connected to the positive power supply terminal $V_B$ through a resistor 32. The emitter of the transistor 33 is grounded, and the collector thereof is connected to an ECU 15.

The structural elements 5 and 21 to 33 constitute a fuel state detector circuit 20A. Also, the structural elements 5 and 21 to 23 constitute ion current detecting means, the structural elements 24 to 27, 28 and 30 constitute knock signal processing means, the structural elements 25 to 27 constitute detection enable/disenable deciding means, and the structural elements 28 and 30 constitute knock signal switching means.

Subsequently, the operation of the combustion state detecting device shown in FIG. 1 in accordance with the first embodiment will be described with reference to FIGS. 2A to 2F. The left side of FIGS. 2A to 2F shows signal waveforms appearing in the respective circuit portions when the internal combustion engine is in a low-revolution state, whereas the right side of FIG. 2A to 2F shows signal waveforms appearing in the respective circuit portions when it is in a high-revolution state.

Figure 2:
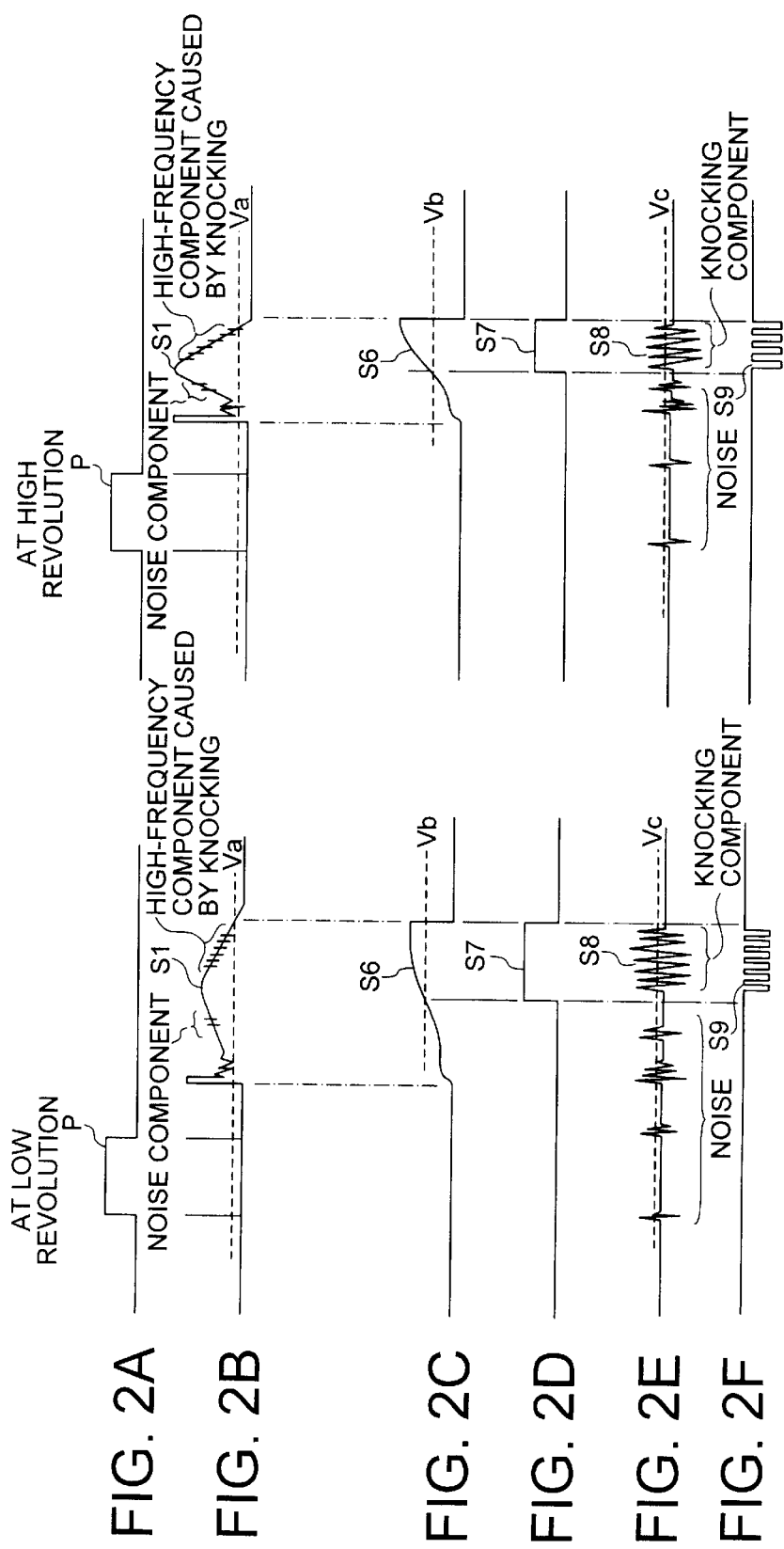
FIGS. 2A to 2F are diagrams for explanation of the operation of the combustion state detecting device for an internal combustion engine in accordance with the first embodiment of the present invention.

The ECU 15 supplies an ignition signal P shown in FIG. 2A to the base of the power transistor 3 at a desired control timing to control the on/off operation of the power transistor 3. As a result, the power transistor 3 interrupts the supply of the primary current flowing in the primary winding 2a of the ignition coil 2 to boost the primary voltage, and also develops an ignition high voltage (for example, several tens kV) at the high-voltage side of the secondary winding 2b. If the combustion state is normal, a required quantity of ions are generated in the periphery of the ignition plug 4 and within the combustion chamber. This operation is identical with that described above.

Also, when the power transistor 3 is turned on in response to the ignition signal P, the supply of the current to the primary winding 2a starts, to thereby develop the voltage of the positive polarity at the high-voltage side of the secondary winding 2b. Sequentially, at the time of interrupting the primary current, if the ignition high voltage is developed at the high-voltage side of the secondary winding 2b to make the ignition plug 4 discharge, the secondary current charges the capacitor 5a up to a predetermined voltage. This operation is identical with that described above.

Since ions occurs due to the discharge of the ignition plug 4, the ion current i flows through the current detector circuit 21 in a direction indicated by a broken-line arrow in FIG. 1 so that an analogous current flows also in the current-voltage convertor circuits 22 and 23, as a result of which an ion current detection signal S1 on which a high-frequency component caused by a noise component or knocking is superimposed as shown in FIG. 2B is obtained at the output sides of the current-voltage convertor circuits 22 and 23.

The ion current detection signal S1 obtained at the output side of the first current-voltage convertor circuit 22 is supplied to the comparator circuit 25 where it is compared with the predetermined reference value Va, and integrated by the integrator circuit 26 so as to be outputted at the output side thereof as a signal s6 shown in FIG. 2C. The signal S6 is compared with the predetermined reference value Vb by the succeeding comparator circuit 27 so that a pulse signal S7 shown in FIG. 2D which is delayed a predetermined time from the rising of the ion current detection signal SI is outputted at the output side of the comparator circuit 27 as a detection enable/disenable signal.

The pulse signal S7 is supplied to the transistor 28 as a switching signal so that the transistor 28 turns on and the transistor 30 turns off when the pulse signal S7 is high in level whereas the transistor 28 turns off and the transistor 30 turns on when the pulse signal S7 is low in level.

On the other hand, the ion current detection signal S1 obtained at the output side of the second current-voltage convertor circuit 23 is supplied to the filter circuit 24a in the knock signal generator circuit 24, where a frequency band substantially corresponding to the knock of the internal combustion engine is extracted from the ion current detection signal S1, and a signal S8 shown in FIG. 2E is outputted at the output side of the filter circuit 24a.

The signal S8 is supplied to the comparator circuit 24b at a succeeding stage where the signal S8 is compared with a predetermined reference value Vc, and its comparison result is outputted, as a pulse signal S9 substantially corresponding to the occurrence of knock as shown in FIG. 2F, to the output terminal OUT of the combustion state detecting device 20A through the final transistor 33 the on/off operation of which is controlled in response to the pulse signal S7 that is a switching signal from the comparator circuit 27.

In other words, since the transistor 28 turns on, and the transistor 30 is off when the pulse signal S7 from the comparator circuit 27 is high in level, the transistor 33 to which the output of the comparator circuit 24b is supplied as it is turns on when the output of the comparator circuit 24b is high in level (when the level of the signal S8 is larger than the reference value Vc) but turns off when it is low in level (when the level of the signal S8 is smaller than the reference value Vc), with the result that the pulse signal S9 shown in FIG. 2F is obtained at the output terminal OUT of the combustion state detecting device 20A as a knock decision signal corresponding to the occurrence of knock.

As described above, according to this embodiment, because a period in which an integral value resulting from charging the capacitor with the ion current exceeds the reference value is set as the detection period, the detection start timing can be set to be late at the low revolution of the engine but to be early at the high revolution of the engine. Therefore, the detection start timing can be set in the vicinity of the peak value of the ion current waveform on which the high-frequency component caused by knocking is superimposed in all the engine r.m.p., with the results that the detection range can be optimized so that the S/N ratio is improved, and an accuracy in the knock detection is improved.

In addition, since the current detector circuit that detects the ion current is made up of the current mirror circuit, a current analogous to the ion current can be supplied to the integrator circuit, thereby making it possible to surely set the detection period of the knock decision signal finally obtained on the basis of the integral value of the ion current.

Second Embodiment

Figure 3:
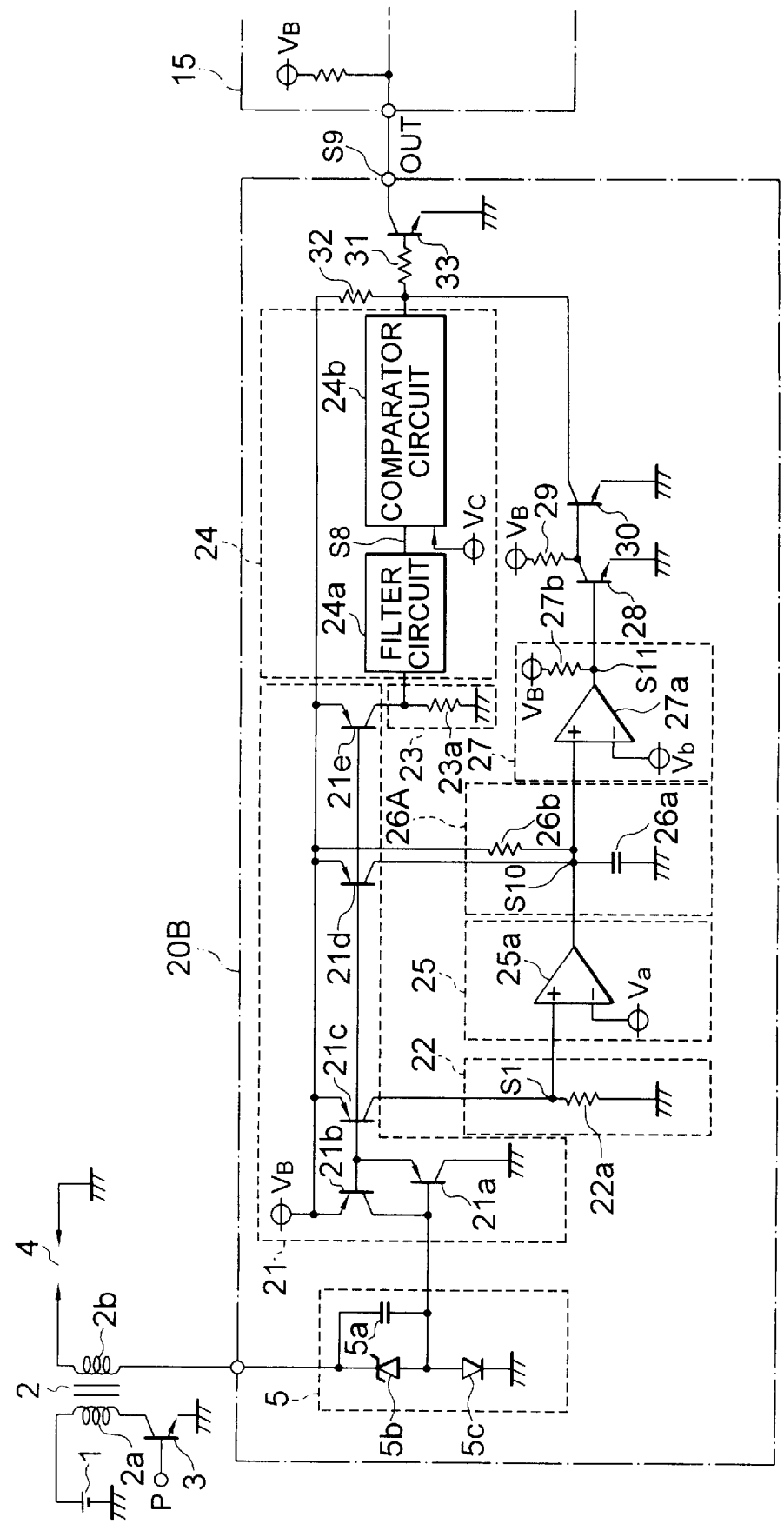
FIG. 3 is a circuit brock diagram showing a combustion state detecting device for an internal combustion engine in accordance with a second embodiment of the present invention.

FIG. 3 is a block diagram showing a combustion state detecting device for an internal combustion engine in accordance with a second embodiment of the present invention, in which parts corresponding to those in FIG. 1 are indicated by the same references, and their duplicate description will be omitted.

There is supposed a case in which any one of the detection start timing at the low revolution of the engine and the detection start timing at the high revolution of the engine is away from the vicinity of the peak value of the waveform of the ion current detection signal in the integrator circuit 26 of the above-described first embodiment, depending on the engine.

In view of the above, in this embodiment, an integrator circuit 26A made up of an integration capacitor 26a connected between the output side of the comparator circuit 25 and the ground, and a resistor 26b connected to one end of the capacitor 26a and the positive power supply terminal $V_B$ is disposed between the first comparator circuit 25 and the second comparator circuit 27 in the combustion state detecting device 20B so as to substantially add a predetermined bias current to the ion current detection signal to conduct integration. Other structures are identical with those in FIG. 1.

FIGS. 4A to 4C show the comparison of integral waveforms and the start timings of detection periods between a case where there is no bias current to the integrator circuit 26 in the above-mentioned first embodiment and a case where there is a bias current to the integrator circuit 26A in this embodiment, where the ion detection signal S1 is straightened for simplification.

The signal S6 indicated by a broken line in FIG. 4B is representative of a signal obtained at the output side of the integrator circuit 26 in FIG. 1 whereas the signal S10 indicated by a solid line is representative of a pulse signal obtained at the output side of the integrator circuit 26A in FIG. 3, with respect to the ion current detection signal S1 shown in FIG. 4A. Likewise, the signal S7 indicated by a broken line in FIG. 4C is representative of a pulse signal obtained at the output side of the comparator circuit 27 in FIG. 1 whereas the signal S11 indicated by a solid line is representative of a pulse signal obtained at the output side of the above-described comparator circuit 27 in FIG. 3.

In the case where the detection start timing at the high revolution of the engine is proper but the detection start timing at the low revolution of the engine is too late in the first embodiment, if the capacitance of the integration capacitor is merely increased to hasten the detection start timing at the low revolution, the detection start timing at the high revolution is also hastened so as to be shifted at an improper position.

However, in the case where the bias current is appropriately added to the integration capacitor 26a through the resistor 26b as shown in FIG. 3, the detection start timing greatly fluctuates at the low revolution of the engine because the ratio of the bias current to the ion current is high, whereas the fluctuation of the detection start timing is slight at the high revolution of the engine because the ratio of the bias current to the ion current is low. For that reason, both the detection start timings at the high revolution and at the low revolution can be set at appropriate positions by changing the value of the resistor 26b to obtain a bias current with a proper value.

As described above, according to this embodiment, because the predetermined bias current is added to the integrator circuit, the detection start timing can be always set at an appropriate position in a wide engine revolution range.

Third Embodiment

Figure 5:
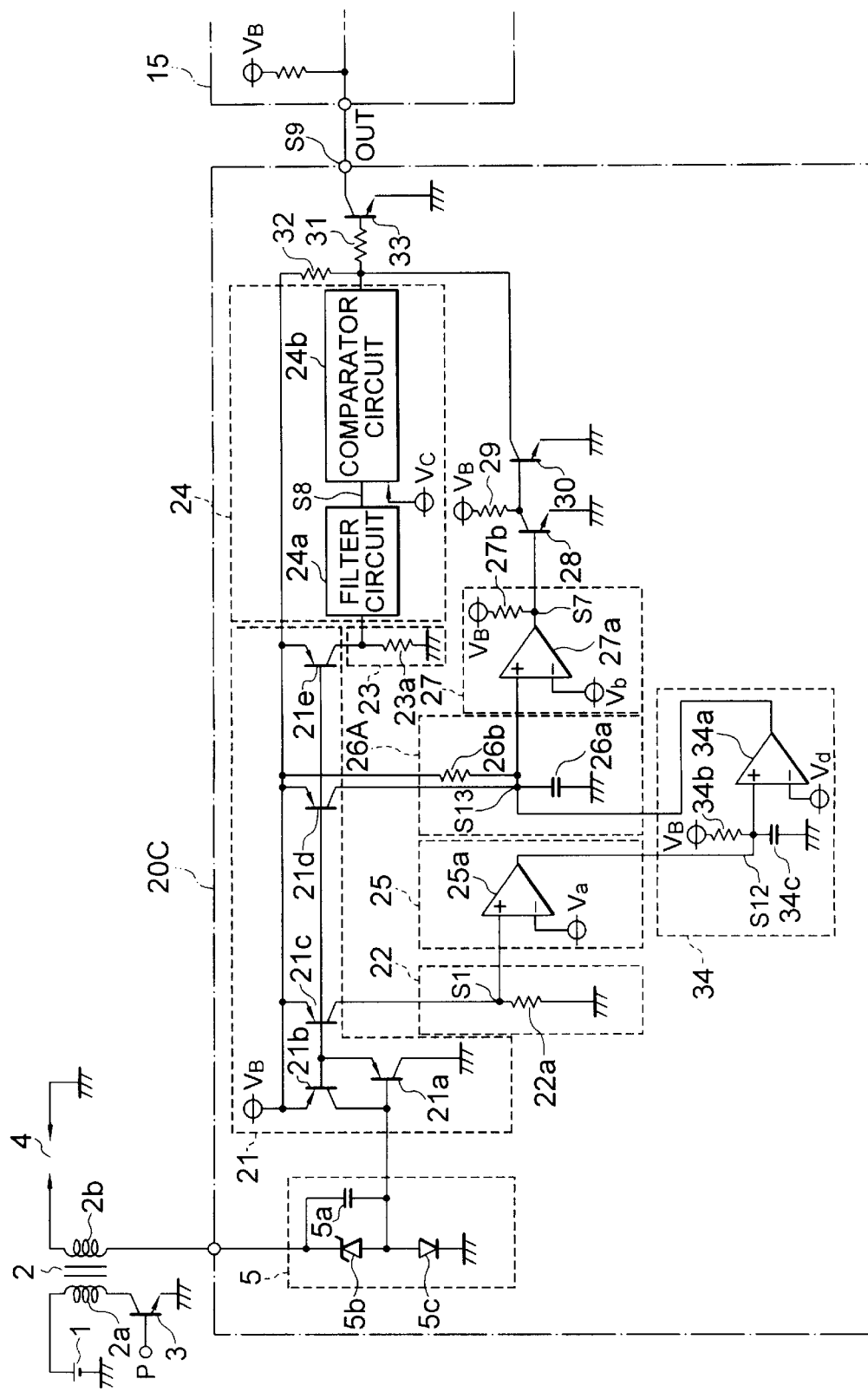
FIG. 5 is a circuit brock diagram showing a combustion state detecting device for an internal combustion engine in accordance with a third embodiment of the present invention.

FIG. 5 is a block diagram showing a combustion state detecting device for an internal combustion engine in accordance with a third embodiment of the present invention, in which parts corresponding to those in FIG. 3 are indicated by the same references, and their duplicate description will be omitted.

The ion current occurs after the discharge of the ignition coil has been completed, and the noise current occurs due to the fluctuation of the discharge voltage at the completion of discharge. In the case where the quantity of noise current is larger than the quantity of normal ion current occurring after the occurrence of the noise current, the detection start timing cannot be set at an appropriate position according to the normal ion current because the integral value of the noise current is large in ratio.

In this embodiment, in order to solve the above problem, the rising of the output waveform of the first comparator circuit 25 is delayed a predetermined period of time by a delay circuit so that the normal ion current is integrated after the occurrence of the noise current has been completed.

In view of the above, in this embodiment, a delay circuit 34 is disposed between the first comparator circuit 25 and the integrator circuit 26A in a combustion state detecting device 20C. Other structures are identical with those in FIG. 3.

The delay circuit 34 includes an operational amplifier 34a, and a resistor 34b and a capacitor 34c which are connected in series between the positive power supply terminal $V_B$ and the ground. The non-inverse input terminal of the operational amplifier 34a is connected to a node of the resistor 34b and the capacitor 34c and also connected to the output side of the first comparator circuit 25. The inverse input terminal of the operational amplifier 34a is connected to a negative power supply terminal having a predetermined reference value Vd, and the output terminal thereof is connected to the input side of the integrator circuit 26A.

Subsequently, the operation of the combustion state detecting device shown in FIG. 5 in accordance with the third embodiment will be described with reference to FIGS. 6A to 6G. The left side of FIGS. 6A to 6G shows signal waveforms appearing in the respective circuit portions when the internal combustion engine is in a low-revolution state, whereas the right side of FIGS. 6A to 6G shows signal waveforms appearing in the respective circuit portions when it is in a high-revolution state.

As in the above-described operation, the ignition signal P (FIG. 6A) is supplied to the power transistor 3, and the ion current detection signal S1 (FIG. 6B) on which the high-frequency component caused by the noise component or knocking is superimposed is obtained at the output sides of the current-voltage convertor circuits 22 and 23.

Figure 6:
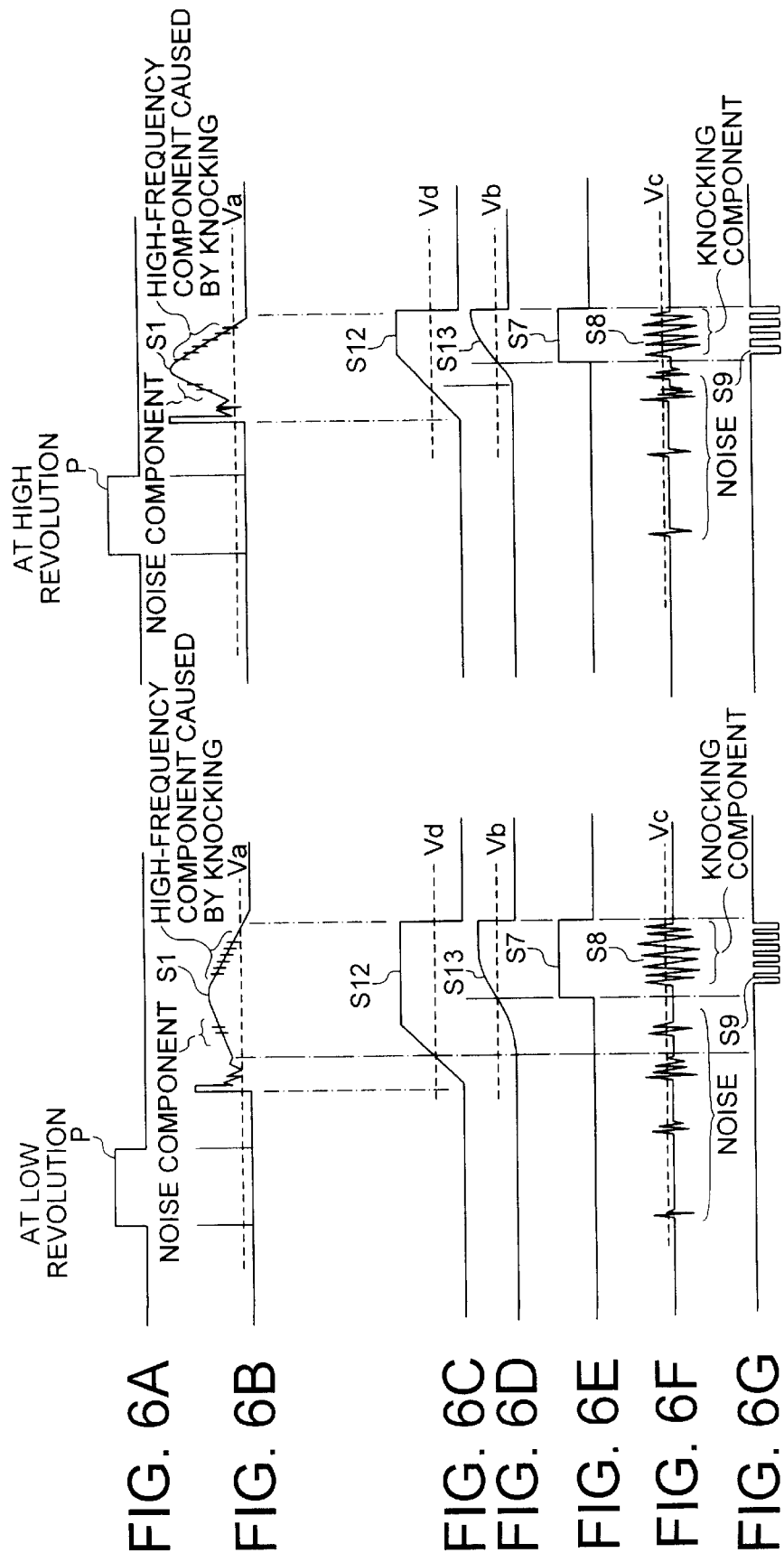
FIGS. 6A to 6G are diagrams for explanation of the operation of the combustion state detecting device for an internal combustion engine in accordance with the third embodiment of the present invention.

The ion current detection signal S1 obtained at the output side of the first current-voltage convertor circuit 22 is supplied to the comparator circuit 25 where it is compared with the predetermined reference value Va, and then supplied to the delay circuit 34 so that a signal S12 shown in FIG. 6C is given to a node of the resistor 34b and the capacitor 34c. The signal S12 is compared with a reference value Vd by the operational amplifier 34a the output of which is further integrated by the integrator circuit 26A so as to be outputted to the output side of the integrator circuit 26A as a signal S13 shown in FIG. 6D. In this example, the integrator circuit 26A integrates a signal delayed a predetermined amount from the rising of the signal S12, that is, only the normal ion current from which the noise component has been substantially removed.

The signal S13 is compared with the predetermined reference value Vb by the succeeding comparator circuit 27 so that a pulse signal S7 shown in FIG. 6E which is delayed a predetermined period of time from the rising of the ion current detection signal S1 is outputted at the output side of the comparator circuit 27.

The pulse signal S7 is supplied to the transistor 28 as a switching signal so that the transistor 28 turns on and the transistor 30 turns off when the pulse signal S7 is high in level, whereas the transistor 28 turns off and the transistor 30 turns on when the pulse signal S7 is low in level.

On the other hand, the ion current detection signal S1 obtained at the output side of the second current-voltage convertor circuit 23 is supplied to the filter circuit 24a in the knock signal generator circuit 24, where a frequency band substantially corresponding to the knock of the internal combustion engine is extracted from the ion current detection signal S1, and a signal S8 shown in FIG. 6F is outputted at the output side of the filter circuit 24a.

The signal S8 is supplied to the comparator circuit 24b at a succeeding stage where the signal S8 is compared with a predetermined reference value Vc, and its comparison result is outputted, as a pulse signal S9 substantially corresponding to the occurrence of knock as shown in FIG. 6G, to the output terminal OUT of the combustion state detecting device 20C through the final transistor 33 the on/off operation of which is controlled in response to the pulse signal S7 that is a switching signal from the comparator circuit 27.

In other words, since the transistor 28 turns on, and the transistor 30 is off when the pulse signal S7 from the comparator circuit 27 is high in level, the transistor 33 to which the output of the comparator circuit 24b is supplied as it is turns on when the output of the comparator circuit 24b is high in level (when the level of the signal S8 is larger than the reference value Vc) but turns off when it is low in level (when the level of the signal S8 is smaller than the reference value vc), with the result that the pulse signal S9 shown in FIG. 6G is obtained at the output terminal OUT of the combustion state detecting device 20C as a knock decision signal corresponding to the- occurrence of knock.

As described above, according to this embodiment, since only the normal ion current from which the noise component has been removed is integrated, the detection start timing can be set at an appropriate position with high accuracy.

Fourth Embodiment

Figure 7:
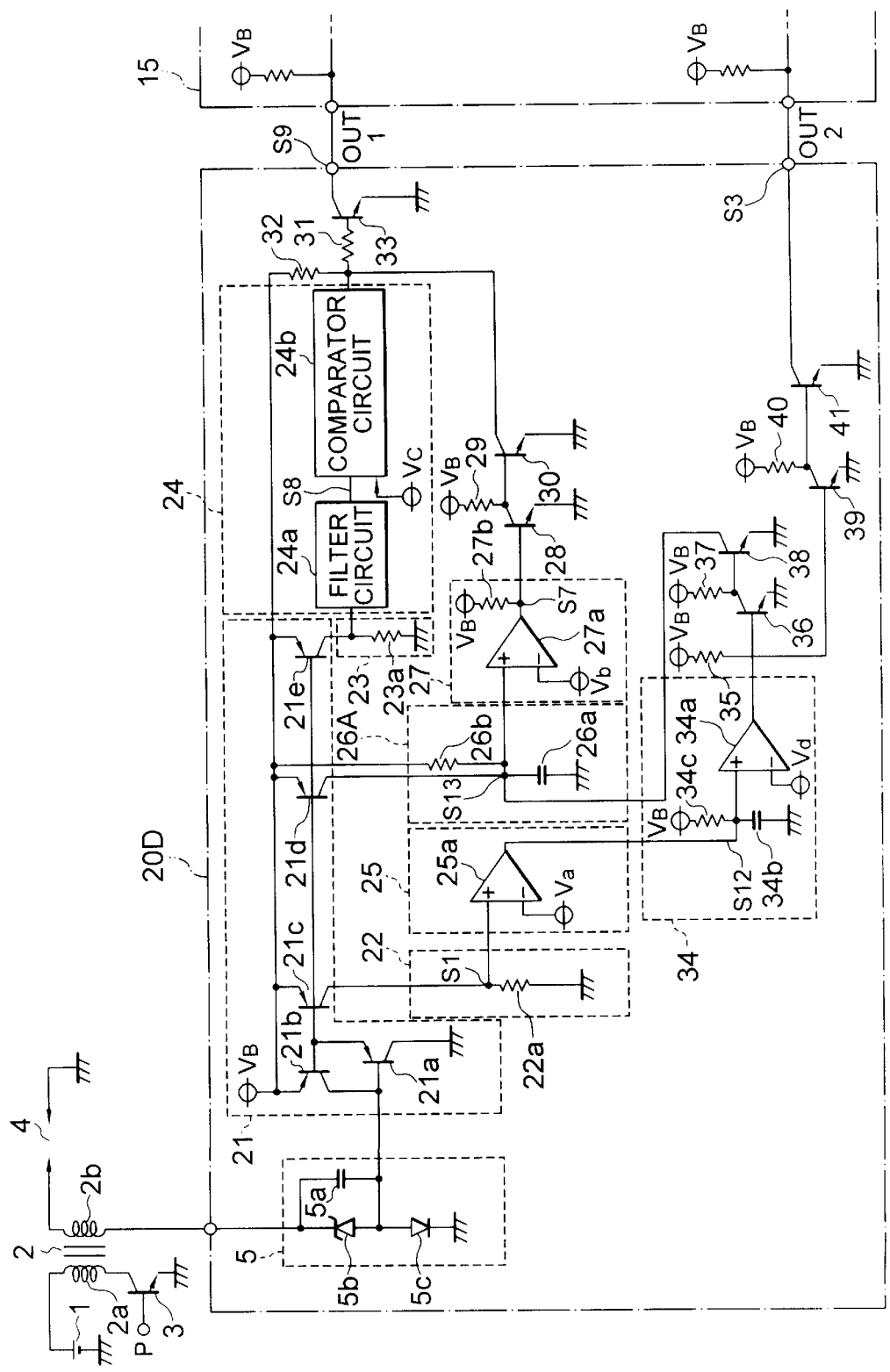
FIG. 7 is a circuit block diagram showing a combustion state detecting device for an internal combustion engine in accordance with the third embodiment of the present invention.

FIG. 7 is a block diagram showing a combustion state detecting device for an internal combustion engine in accordance with a fourth embodiment of the present invention, in which parts corresponding to those in FIG. 5 are indicated by the same references, and their duplicate description will be omitted.

In this embodiment, there is provided a function of deciding misfire in addition to knock decision, and the delay circuit 34 shown in FIG. 5 also serves as delay means for producing a misfire decision signal for substantially deciding whether the combustion of the internal combustion engine is made, or not.

In view of the above, a pair of transistors 36 and 38 and a pair of transistors 39 and 41 are provided so that the bases of the transistors 36 and 39 are connected to the output side of the delay circuit 34. Also, the bases of the transistors 36 and 39 are connected to the positive power supply terminal $V_B$ through a resistor 35, the emitters thereof are grounded, and the collectors thereof are connected to the positive power supply terminal $V_B$ through resistors 37 and 40, respectively. Also, the collectors of the transistors 36 and 39 are connected to the base of the transistors 38 and 41, respectively, the emitters of the transistors 38 and 41 are grounded together, the collector of the transistor 38 is connected to the input side of the integrator circuit 26A, and the collector of the transistor 41 is connected to a second output terminal OUT2 of a combustion state detecting device 20D.

The operation relating to knock detection in the operation shown in FIG. 7 is substantially identical with that of the circuit shown in FIG. 5, and the pulse signal S9 (FIG. 6G) is obtained at the first output terminal OUT1 of the combustion state detecting device 20D as a knock decision signal corresponding to the occurrence of knock.

Also, the operation relating to misfire detection is that when the level of the signal S12 is smaller than the reference value Vd of the operational amplifier 34a in the delay circuit 34, the transistor 39 turns off, and the transistor 41 turns on so that the pulse signal S3 (FIG. 9D) is obtained at the second output terminal OUT2 of the combustion state detecting device 20D as the misfire decision signal for deciding the combustion of the internal combustion engine is made, or not. In other words, the ECU 15 decides that combustion is normally conducted when the inputted signal S3 is high in level, whereas misfire occurs when it is low in level.

As described above, according to this embodiment, since the delay circuit used for knock decision also serves as the delay means for producing the misfire decision signal for substantially deciding whether the internal combustion engine is burned, or not, the simple circuit structure makes it possible to conduct the misfire decision in addition to the knock decision at the same time.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A combustion state detecting device for an internal combustion engine, comprising:
   an ignition coil which develops an ignition high voltage;
   an ignition plug which discharges by application of said ignition high voltage to fire a fuel-air mixture within a cylinder of an internal combustion engine;
   ion current detector including bias means for applying a bias voltage to said ignition plug, said ion current detector operable to detect an ion current corresponding to a quantity of ions generated within said cylinder in which the fuel-air mixture is being burned as an ion current detection signal;
   knock signal processor operable to produce a knock decision signal representative of a knock occurrence state of said internal combustion engine on the basis of said ion current detection signal; and
   an ECU which arithmetically operates the control parameter of said internal combustion engine and detects the combustion state in said ignition plug on the basis of said ion current detection signal and said knock decision signal;
   wherein said knock signal processor sets a detection period of said knock decision signal on the basis of an integral value of said ion current detection signal.

2. A combustion state detecting device for an internal combustion engine as claimed in claim 1, wherein said knock signal processor comprises: a filter operable to extract a frequency band corresponding to the knock of said internal combustion engine from said ion current detection signal; detection enable/disable determination device operable to output a detection enable/disable signal representing whether or not said knock decision signal can be detected on the basis of said ion current detection signal; and knock signal switch operable to make an output of said knock decision signal valid only when said detection enable/disable signal represents a detection enable state.

3. A combustion state detecting device for an internal combustion engine as claimed in claim 2, wherein said detection enable/disable determination device comprises: a first comparator circuit operable to compare said ion current detection signal with a first predetermined reference value; an integrator circuit operable to integrate said ion current detection signal during a period where said ion current detection signal exceeds said first reference value on the basis of a comparison result of the first comparator circuit; and a second comparator circuit which compares an output value of said integrator circuit with a second predetermined reference value to output said detection enable/disable signal during a period where the output value of said integrator circuit exceeds said second reference value.

4. A combustion state detecting device for an internal combustion engine as claimed in claim 3, wherein said ion current detector comprises a current mirror circuit disposed downstream of said bias means, and a plurality of current-voltage circuits, wherein said current mirror circuit supplies a current analogous to said ion current detection signal to said plurality of current-voltage circuits and said integrator circuit.

5. A combustion state detecting device for an internal combustion engine as claimed in claim 3, wherein said integrator circuit adds a predetermined current value to said ion current detection signal to integrate the predetermined current value added to the ion current detection signal.

6. A combustion state detecting device for an internal combustion engine as claimed in claim 3, wherein said enable/disable determination device further comprises delay means for delaying a change in an output state of said first comparator circuit for a predetermined period when a comparison result of said first comparator circuit exceeds the first reference value.

7. A combustion state detecting device for an internal combustion engine as claimed in claim 5, wherein the predetermined current value added to said integrator circuit is set so that a detection start timing of said detection enable/disable signal is positioned in a vicinity of a peak position of the ion current detection signal in all drive conditions under which knock control is conducted.

8. A combustion state detecting device for an internal combustion engine as claimed in claim 6, wherein said delay means also serves as delay means for producing a misfire decision signal which decides whether the internal combustion engine is burned or not.

9. A combustion state detecting device for an internal combustion engine, comprising:
   an ignition coil operable to generate an ignition voltage;
   an ignition plug operable to discharge upon application of said ignition voltage to fire a fuel-air mixture within a cylinder of an internal combustion engine;

ion current detector including a bias means operable to apply a bias voltage to said ignition plug and a current mirror circuit disposed downstream of said bias means, said ion current detector operable to detect an ion current corresponding to a quantity of ions generated within said cylinder in which the fuel-air mixture is being burned as an ion current detection signal and wherein said current mirror circuit is operable to generate a current analogous to said ion current detection signal;

knock signal processor operable to produce a knock decision signal representative of a knock occurrence state of said internal combustion engine on the basis of said ion current detection signal; and an ECU operable to operate a control parameter of said internal combustion engine and detect a combustion state in said ignition plug on the basis of said ion current detection signal and said knock decision signal;

wherein said knock signal processor sets a detection period of said knock decision signal on the basis of an integral value of said ion current detection signal.

10. A combustion state detecting device for an internal combustion engine as claimed in claim 9, wherein said knock signal processor comprises: a filter operable to extract a frequency band corresponding to the knock of said internal combustion engine from said ion current detection signal; detection enable/disable determination device operable to output a detection enable/disable signal representing whether or not said knock decision signal can be detected on the basis of said ion current detection signal; and knock signal switch operable to make an output of said knock decision signal valid only when said detection enable/disable signal represents a detection enable state.

11. A combustion state detecting device for an internal combustion engine as claimed in claim 10, wherein said detection enable/disable determination device comprises: a first comparator circuit operable to compare said ion current detection signal with a first predetermined reference value; an integrator circuit operable to integrate said ion current detection signal during a period where said ion current detection signal exceeds said first reference value on the basis of a comparison result of the first comparator circuit; and a second comparator circuit which compares an output value of said integrator circuit with a second predetermined reference value to output said detection enable/disable signal during a period where the output value of said integrator circuit exceeds said second reference value.

12. A combustion state detecting device for an internal combustion engine as claimed in claim 11, wherein said integrator circuit adds a predetermined current value to said ion current detection signal to integrate the predetermined current value added to the ion current detection signal.

13. A combustion state detecting device for an internal combustion engine as claimed in claim 11, wherein said enable/disable determination device further comprises delay means for delaying a change in an output state of said first comparator circuit for a predetermined period when a comparison result of said first comparator circuit exceeds the first reference value.

14. A combustion state detecting device for an internal combustion engine as claimed in claim 13, wherein the predetermined current value added to said integrator circuit is set so that a detection start timing of said detection enable/disable signal is positioned in a vicinity of a peak position of the ion current detection signal in all drive conditions under which knock control is conducted.

15. A combustion state detecting device for an internal combustion engine as claimed in claim 14, wherein said delay means also serves as delay means for producing a misfire decision signal which decides whether the internal combustion engine is burned or not.

* * * * *